FIG.I.

Feb. 16, 1943.   W. F. STIMPSON ET AL   2,311,264
WEIGHING SCALE
Filed June 21, 1939   3 Sheets-Sheet 2

INVENTORS
WALTER F. STIMPSON
MODESTE J. LACHANCE
BY
ATTORNEYS

Feb. 16, 1943. W. F. STIMPSON ET AL 2,311,264
WEIGHING SCALE
Filed June 21, 1939 3 Sheets-Sheet 3
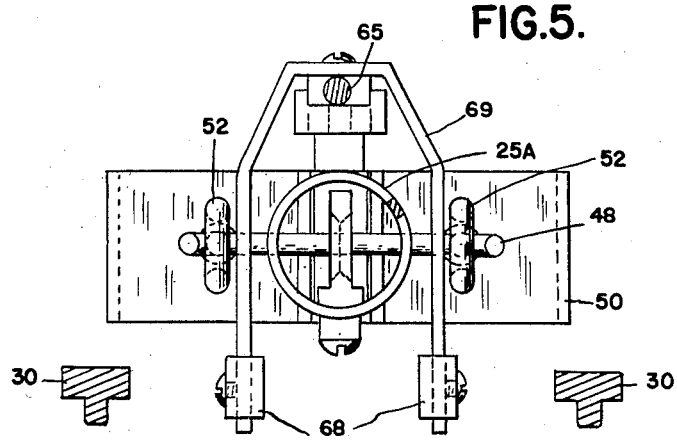
FIG.5.
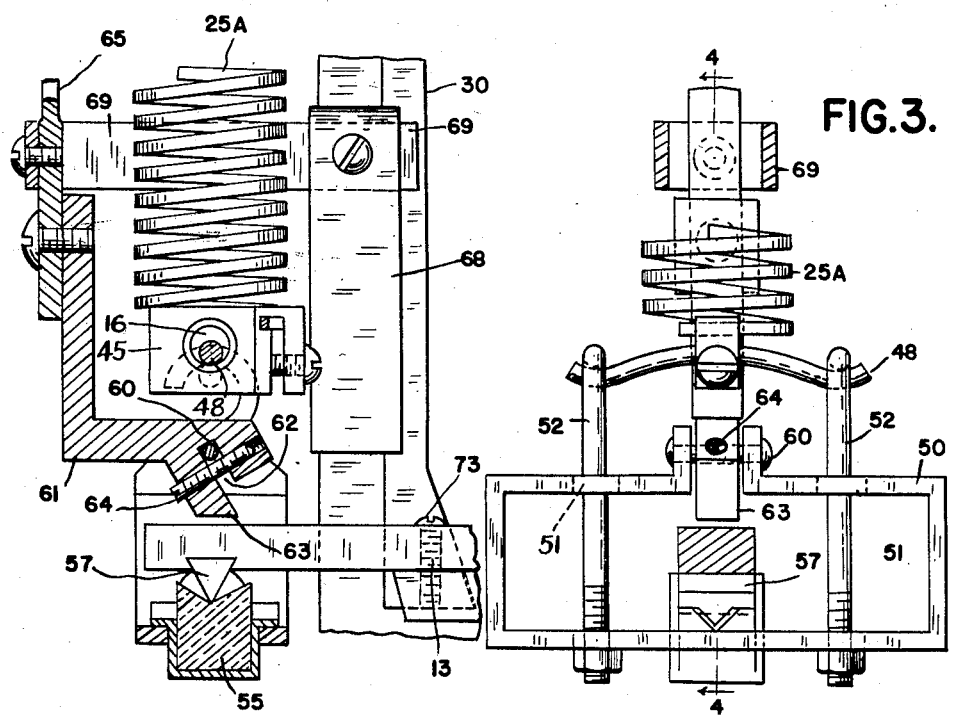
FIG.3.
FIG.4.
INVENTORS
WALTER F. STIMPSON
MODESTE J. LACHANCE
BY
ATTORNEYS Patented Feb. 16, 1943

2,311,264

UNITED STATES PATENT OFFICE 2,311,264

WEIGHING SCALE

Walter F. Stimpson and Modeste J. Lachance, Louisville, Ky.; said Lachance assignor to said Stimpson Application June 21, 1939, Serial No. 280,358

2 Claims. (Cl. 265—68)

This invention relates to computing weighing scales of the cylindrical chart type, and aims to provide an improved scale of this character which is of very simple and inexpensive construction and rugged character, highly sensitive and accurate, not easily put out of adjustment, and capable of operating at full efficiency even though considerably out of the level position of intended operation.

When equipped with spring counterbalancing means, practical considerations have in the past required that such scales be provided with multiple spring assemblies, arranged in parallel relation and equipped with some form of equalizing means. Such equalizing means and multiple spring assemblies have not only considerably complicated construction, but have necessitated maintaining the scale approximately level at all times, as otherwise accuracy would be sharply affected. The present invention aims to provide a cylinder-type scale having a single counterbalancing spring assembly, mounted and connected to the other operative parts in an improved and simplified manner which actually increases the sensitivity of the scale, while also greatly diminishing the harmful effects of tilting, so that accuracy and sensitivity are maintained even though the scale be positioned considerably out of plumb.

A further and related object is to provide a scale of the indicated character incorporating improved means for interconnecting the nose iron, rack rod, and counterbalancing spring means, such interconnecting means being so arranged as to allow the use of heavier parts than has heretofore been possible, while the disposition of the parts in question is such that when assembled they are mutually interlocked, the relatively movable elements connected to the nose iron preventing displacement of one another, yet not interfering with their freedom of action.

A further object is to so arrange the parts in question that they may be removed and installed, during servicing of the scale as well as in its original construction, with the greatest of ease, and entirely from the back of the scale.

Other objects and advantages will be apparent from the following description, wherein reference is made to the accompanying drawings illustrating a preferred embodiment of our invention and wherein similar reference numerals designate similar parts throughout the several views.

In the drawings:

Figure 3 is a sectional detail taken substantially on the line 3—3 of Figure 2, and looking in the direction of the arrows.

Figure 4 is a vertical section taken substantially on the line 4—4 of Figure 3, and looking in the direction of the arrows.

Figure 5 is a horizontal section taken substantially on the line 5—5 of Figure 2, and looking in the direction of the arrows.

Figure 1:
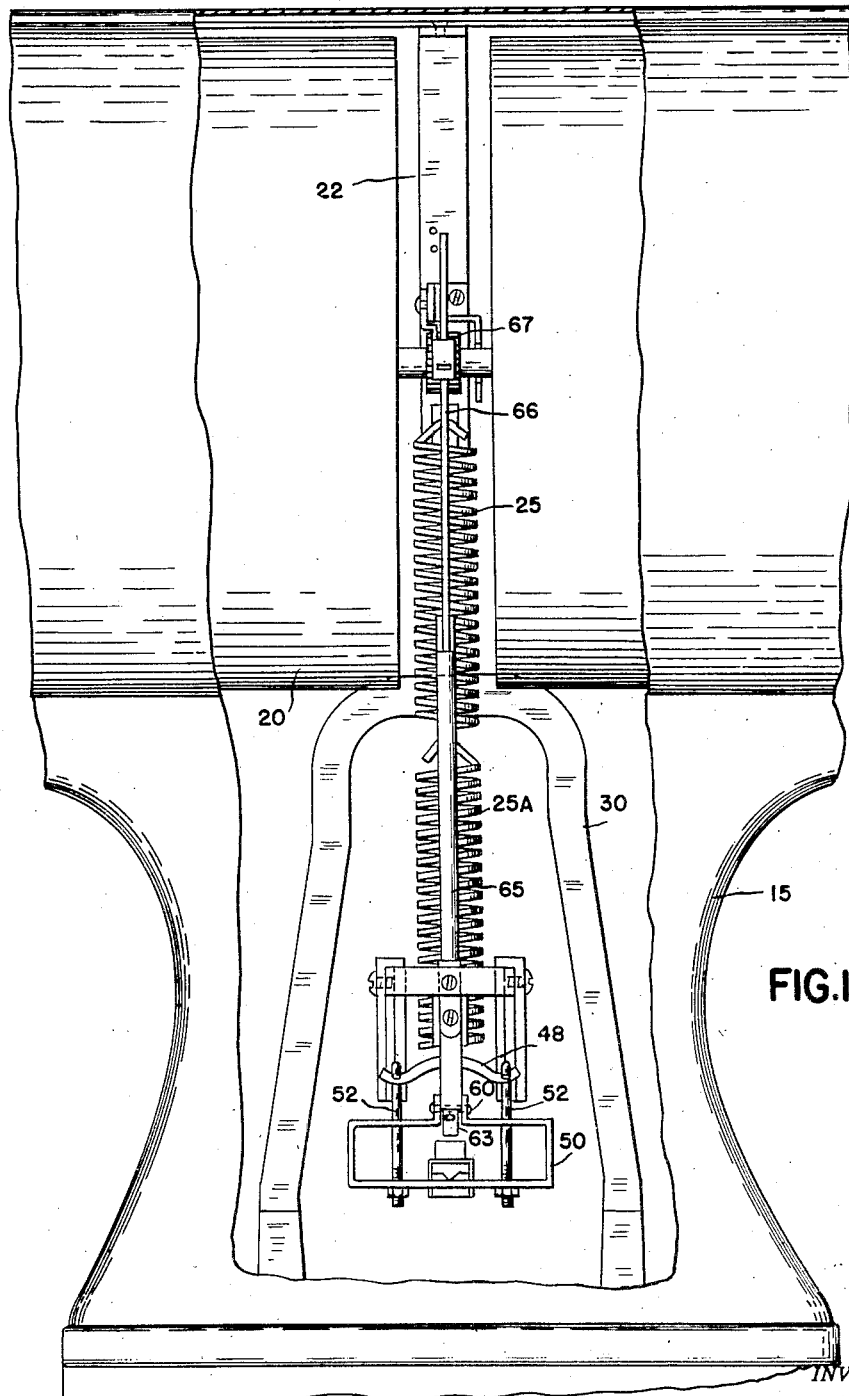
Figure 1 is a fragmentary rear elevational view of a weighing scale incorporating the principles of this invention, the housing being partly broken away and the chart indicated somewhat diagrammatically.
Figure 2:
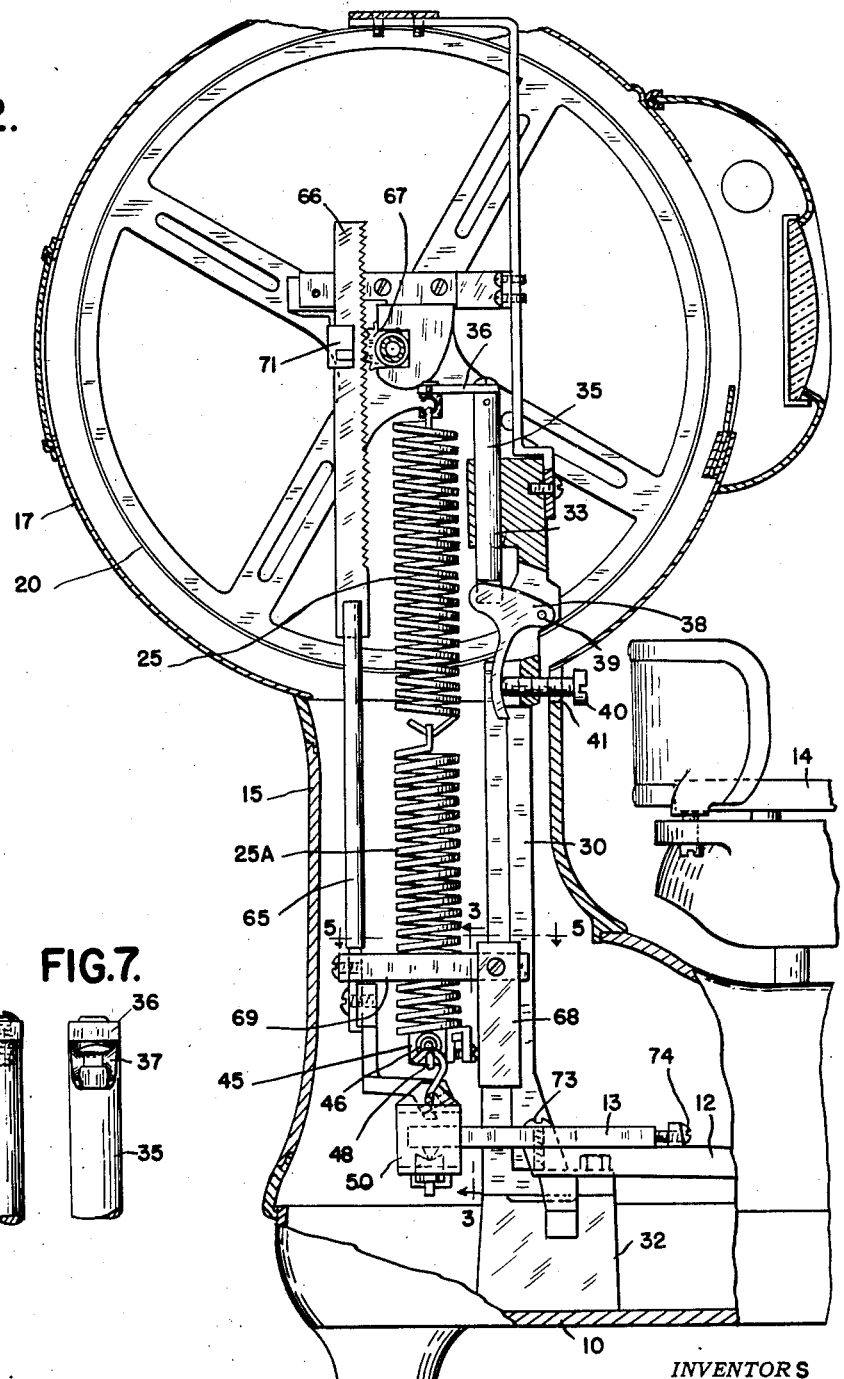
Figure 2 is a view partly in side elevation and partly in vertical section, taken substantially centrally of the scale and with the top of the chart housing broken away.
Figures 6, 7:
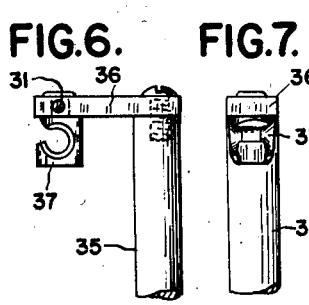
Figures 6 and 7 are fragmentary side and front elevational views, respectively, of the spring hanger.

Referring now to the drawings:

Reference character 10 designates the hollow base of our improved weighing scale. Within the base is a lever construction, the details of which form no part of the present invention. Accordingly, only the rear end of the main lever 12 is shown in the drawings. Mounted upon the lever system above the base, and adapted to deflect the nose iron in proportion to loading thereof, is a platform 14. A hollow column 15 upstanding from the rear of the base carries at its top the chart housing 17, within which the cylindrical chart 20 is journaled.

The load-counterbalancing means comprises a spring assembly disposed centrally of the scale and projecting upwardly through the column 15 into a gap 22 in the chart. The spring means, which may be formed in upper and lower sections 25, 25A, hooked together at their ends, is supported from the base of the scale by a standard 30 of inverted U shape, the legs of which are securely bolted at their lower ends to relatively heavy supporting blocks 32, cast integrally with the base. The upper end of the standard projects into the gap in the chart and is vertically apertured as at 33 to slidably receive the adjustable spring hanger post 35. The post carries at its top an outwardly projecting arm 36 in which a hook-like hanger block 37 is mounted for rotation about the axis of the spring assembly. The upper spring section is hooked in the block 37, which may be locked in any desired angular position by means of a set screw 31. Angular adjustment of the hook 37 allows elimination of torsion from the spring assembly, and permits the stirrup 50 to be positioned accurately in a position perpendicular to the nose iron. An adjusting cam 38 pivoted on a pin 39 in the standard engages in a slot in the bottom of the spring post and normally holds it and the spring means against movement. The cam is rockable for zero adjustment by means of a screw 40 threaded in the standard and accessible through an opening 41 in the face of the column.

The springs are of the thermostatically self-correcting type, the lower end of the bottom section being secured to a spring clamp 45 having a transverse opening 46 therein which may be provided with a knife edge. A rockable cross bar 48 extends through and from either side of the aperture in the spring clamp to support the steelyard stirrup 50, which is suspended therefrom by hooks 52 and supports in a suitable opening in its bottom a rockable bearing block 55, of agate or other suitable substance, in which rests the knife-edge nose iron bearing 57.

It will be seen that the stirrup hooks 52 are secured only to the bottom bar of the stirrup 50, projecting freely through enlarged openings 51 in the top bar. The top bar also carries a cross pin 60 to which is pivoted the rack link 61. The rack link will be seen to be provided for this purpose with an angular slot 62 (Figure 4) of such size as to fit rockably over the pin, which is retained in the slot by a screw 64. The position of screw 64 will be seen to make the head thereof accessible from the rear of the scale above the nose iron. The lower arm which supports the retaining screw 64 is somewhat elongated, as indicated at 63, and overlies the nose iron to prevent displacement of the nose iron pivot 57. The rack rod 65 is attached to the upper end of the rack link and projects upwardly into the chart housing, where its rack portion 66 meshes with the chart pinion 67.

Proper engaging pressure between the rack and pinion is maintained by a pair of weights 68 supported by the forwardly projecting arms of a yoke 69 attached to the rack rod, the arms extending freely on the other side of the spring means, and the spacing of the yoke arms and weights being sufficient to permit removal of this counterweighting assembly, with the rack rod, after the screw 64 has been removed, without disturbing the spring and steelyard assembly.

A suitable rack guide 71 embraces the rear edge of the rack 66. It will also be noted that the nose iron is adjustably secured to the main lever 12, by means of a screw 73 extending through a slot in the nose iron and serving when tightened to clamp the same to the lever. When such screw is loosened, longitudinal movement of the nose iron may be effected by an adjusting screw 74.

We claim:

1. In a weighing scale, in combination with load-receiving means, a nose iron actuable thereby, weight indicating means arranged above the nose iron, load-counterbalancing tensile spring means extending upwardly from said nose iron, stirrup means connecting the spring means and nose iron, an actuating rod member for said weight indicating means pivotally connected to said stirrup means and extending upwardly beside said spring means on the opposite side thereof from said load-receiving means, an overbalancing weight assembly attached to said rod member and extending on either side of said spring means, all portions of said overbalancing-weight assembly which extend on opposite sides of and beyond said spring means being spaced farther apart than the maximum diameter of said spring means, and the rod means and spring means being aligned with said nose iron.

2. In a weighing scale, in combination with load-receiving means, a nose iron actuable thereby, weight indicating means arranged above the nose iron, load-counterbalancing tensile spring means extending upwardly from said nose iron, means connecting the spring means and nose iron including a stirrup, an actuating rod member for said weight indicating means, pivotally connected to said stirrup and extending upwardly deside said spring means on the opposite side of the latter from said load-receiving means, an overbalancing weight connected to said rod member, a centrally disposed bearing bracket attached to the lower end of said spring means, a transversely extending rockable load transmitting member seated in said bearing bracket, laterally spaced means connecting said stirrup to said load-transmitting member on opposite sides of said bearing bracket, and bearing means connecting the stirrup and nose iron.

WALTER F. STIMPSON.
MODESTE J. LACHANCE.